United States Patent
Koshelevs

(10) Patent No.: US 9,304,026 B2
(45) Date of Patent: Apr. 5, 2016

(54) DIRECT-FLOW CORIOLIS MASS FLOWMETER

(71) Applicant: Jurijs Koshelevs, Riga (LV)

(72) Inventor: Jurijs Koshelevs, Riga (LV)

( * ) Notice: Subject to any disclaimer, the term of this patent is extended or adjusted under 35 U.S.C. 154(b) by 45 days.

(21) Appl. No.: 14/359,090

(22) PCT Filed: Oct. 30, 2012

(86) PCT No.: PCT/IB2012/055988
§ 371 (c)(1),
(2) Date: May 17, 2014

(87) PCT Pub. No.: WO2013/076600
PCT Pub. Date: May 30, 2013

(65) Prior Publication Data
US 2014/0326076 A1 Nov. 6, 2014

(51) Int. Cl.
*G01F 1/84* (2006.01)
*G01F 15/00* (2006.01)

(52) U.S. Cl.
CPC .............. *G01F 1/849* (2013.01); *G01F 1/8409* (2013.01); *G01F 1/8413* (2013.01); *G01F 15/00* (2013.01)

(58) Field of Classification Search
CPC .................................... G01F 1/84; G01F 1/32
USPC .......................... 73/861.355–861.357, 861.22
See application file for complete search history.

(56) References Cited

U.S. PATENT DOCUMENTS 4,972,724 A 11/1990 Ricken
2004/0112144 A1 6/2004 Hussain et al.

FOREIGN PATENT DOCUMENTS

EP 0596178 A1 5/1994
RU 2285245 C2 10/2006

OTHER PUBLICATIONS

International Search Report, Jan. 21, 2013, from International Phase of the instant application.

*Primary Examiner* — Jewel V Thompson
(74) *Attorney, Agent, or Firm* — Cahn & Samuels, LLP

(57) ABSTRACT

The direct-flow Coriolis mass flowmeter comprises a tensioned section of string, along which a substance to be measured flows, a device for tensioning the section of string, a device for exciting a transverse circular oscillatory movement in the string, two sensors which are spaced apart along the string and which convert the magnitude of a transverse deflection of the string in two mutually perpendicular directions into electrical signals, wherein these signals are coupled to inputs of a microprocessor device which calculates the flowrate as a function of the difference in phases of the signals from the sensors.

5 Claims, 1 Drawing Sheet

DIRECT-FLOW CORIOLIS MASS FLOWMETER

TECHNICAL FIELD

The invention relates to the field of flow measurement of liquid, gaseous and multiphase mediums.

BACKGROUND ART

There is a known construction [20] of a straight-tube Coriolis mass flow meter, where the flow tube is vibrated at a resonance frequency of a natural vibration in a highest antisymmetric mode. The flowmeter has sections of oval cross section that provide low bending resistance to the vibration at the points where amplitude is largest.

There is a known construction [21] of straight-tube Coriolis mass flow meter, that consists of an actuator means are provided to excite the tube at a point intermediate the inlet and outlet ends. Causing the tube to vibrate in a circular path. When fluid flows there through, the tube is subjected to Coriolis forces. A pair of sensor are disposed at respective points between the inlet and outlet ends of the tube and the excitation point to yields in response to the torsional oscillations.

DISCLOSURE

Technical Problem

In known flow meters resonance system represents a pipe segment that is fixed by both ends. From the theoretical mechanic's point of view, this segment represents a beam. Beam's equations of motion in the capacity of basic parameters involve the properties of material, from which this beam is made of.

Sensitive element of known devices is a vibrating pipe, which has a contact with a measured substance, that is why any negative environmental impact on the material of a pipe (temperature, pressure, chemical corrosion, inward wall diffusion, radiation-induced swelling) will affect its toughness and, as a consequence, the result of a flow measurement;

Resonating characteristics and sensitivity of system depends on the length of a pipe, its wall thickness and elastic characteristics of pipe's material. On the other hand, pipe's material and the thickness of its walls are defined by the parameters of measured substance, particularly, by pressure and chemical characteristics. In virtue of those causes an independent target of the abovementioned parameters turns out to be technologically challenging or unrealizable.

Technical Solution

In known flow meters resonance system represents a pipe segment that is fixed by both ends. From the theoretical mechanic's point of view, this segment represents a beam. Beam's equations of motion in the capacity of basic parameters involve the properties of material, from which this beam is made of Unlike the known flow meters, as an oscillative device system a string is used instead of a beam. From the theoretical mechanic's point of view, a string is distinguished from a beam by the fact that its lateral stiffness is negligible, but the speed of shear-wave propagation along the string and resonant frequency is defined only by the tensile force exerted along the string, as well as its linear density (a measure of mass per unit of length). As an example it can be mentioned vertically placed piece of wire-reinforced hose, the upper end of which is fixed, but at the bottom one has a load suspended to it. It is obvious that in the given example, hose stretching device (weight) does not have any contact with measured agent and that is why it is not a subjected to its influence. On the other hand, reinforcement does not allow the hose to stretch, which allows constant lateral section.

Directly measured parameter sensor signal phase shift is inversely proportional to a certain power function of a lateral stiffness. The raise of sensitivity is attained by the fact that string's lateral stiffness is defined only by tensile force, that is why the adjustment of this force can be made far less than the one needed for the beam. Consequently, sensitivity to flow rate is higher, than with flow meters of known construction.

Advantageous Effects

The division of resonance system and measured substance leads to decrease or complete elimination of the impact of characteristics and parameters of measured agent onto the flow meter operation.

The raise of sensitivity to the flow rate and, as a consequence, the decrease of false output signals in the absence of flow.

DISCLOSURE

The operating principle of device is shown on the drawing 1. The substance moves along the stretched string, the mass flow is indicated with the vector G. Because the string is symmetrical, resonant frequencies coincide in all directions of x that are perpendicular to its direct-axis. That is why potentially in a string there can appear transverse vibration on a frequency of main resonance co simultaneously in two orthogonally related directions x and y with phases, at an angle of with 90°. At such a vibration each point of string will make a rolling motion around the string's equilibrium position. String is put in motion by actuator, constraining force is applied in point P2, displacement vector at an arbitrary point of time is indicated with an arrow with a beginning at the point P2.

As an example the figure illustrates two more points P1 and P3 and their displacement vectors in the same moment of time. In the consequence of an impact of Coriolis force the phase (for the P1 point the phase equals to an angle marked a) of rolling motion continuously varies. With a help of electrical device this displacement phase transforms into a signal, which is proportional to mass flow.

BEST USE OF THE INVENTION

Figure 1:
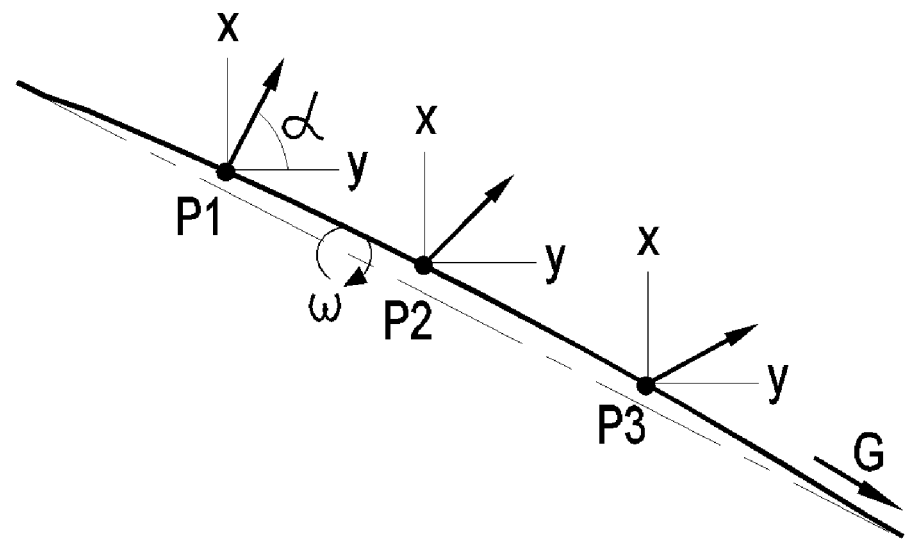
FIG. 1. The operating principle of proposed device.
Figure 2:
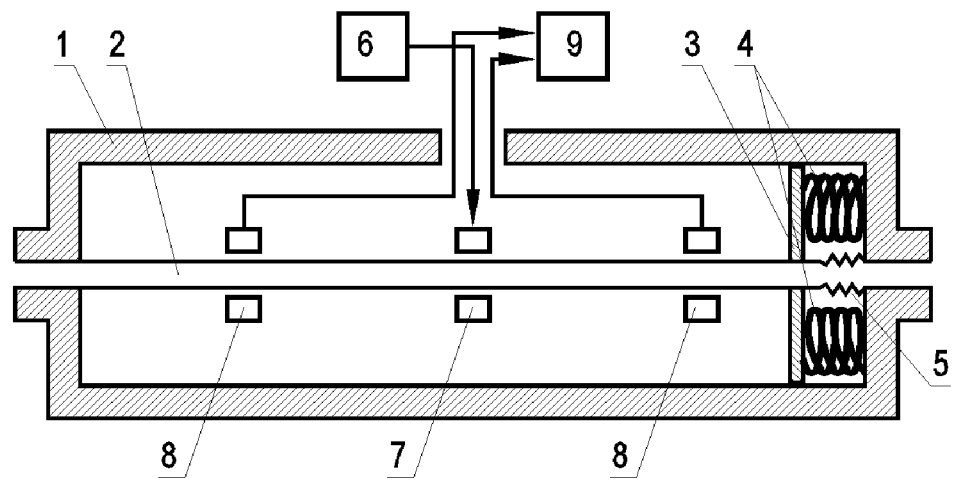
FIG. 2. Preferred version of device's design.

One of the preferred versions of device's implementation is shown in FIG. 2. Construction consists of internal mechanically rough cylindrical block 1, inside of which is placed a hollow-centered string 2. The measured substance enters through the hole in the left (by the figure) part of the block, then into the string appended to it and, finally, comes out through the hole in the right part of the block.

At the right end of the string is fixed a disc 3 with external diameter, which equals to internal diameter of block 1, that is why the disc can move only longitudinally and prevents the lateral motion of string's end. There are pre-tensioned springs 4 attached to the disc 3 and to the right end of the block. That is the reason why the string is stretched. Resonant frequency is regulated by the tension of the springs. In the given construction the device of (spring) tension is not subjected to the negative effect of measured substance, that is why springs maintain their characteristics for the longer period of time and can be made from the material with stable mechanical parameters, but not corrosion-resistant.

In order to compensate slight displacements caused by the changes in temperature in given construction is used resilient bellow, which connects the right end of string and the block.

Sine-wave oscillator 6 with a help of exciter 7 leads the string onto a frequency of its main resonance in transverse-circular motion. Sensors 8 transform string's transverse displacement in two orthogonally related directions into electric signals, which are received by the electronic module 9. It contains analog-digital converter and microprocessor, which at phase displacement, using the preserved calibration charts or calibration equations from its read-only memory, calculates the mass flow, modifies it into electric signal and shows on the display.

SOURCES OF INFORMATION

U.S. Pat. No. 4,823,614 issued Apr. 25, 1989.
U.S. Pat. No. 4,972,724 issued Nov. 27, 1990.

INDUSTRIAL APPLICABILITY

Device can be used as a flow meter for liquid and gaseous mediums in different branches of industry.

The invention claimed is:

1. A device for mass flow measurement with the use of Coriolis force, wherein it represents a strained piece of string along or within which longitudinally is a channel for the flow of the measured substance, device for the longitudinal stretching of the piece of a string, device for putting the string piece into transverse circular oscillative motion on a frequency of natural resonance and two sensors, delivered along the string, which will transform the value of lateral displacement of string in two orthogonally related directions into electrical signals, those signals being connected to the inputs of microprocessor unit, which modifies signals into digital form and calculates the flow rate as a function of sensors' signal phase difference.

2. The device as set forth in claim 1, wherein the string has a form of a tube, that has the correlation of its wall thickness to its external diameter not exceeding ⅕, in order to raise a sensitivity to flow rate.

3. The device as set forth in claim 1, wherein the string has a form of a tube and the wall of this tube is longitudinally ruffled, in order to raise a sensitivity to flow rate.

4. The device as set forth in claim 1, wherein a wall of the string is made from elastic, tensionless and measured substance-proof material, for example, impregnated fabric, in order to raise a sensitivity to flow rate.

5. A flow rate measuring method wherein, in order to measure the flow, there is used a device according to claim 1.

* * * * *